United States Patent
Jang et al.

(10) Patent No.: US 10,381,682 B2
(45) Date of Patent: Aug. 13, 2019

(54) LITHIUM ION-CONDUCTIVE SULFIDE-BASED SOLID ELECTROLYTE COMPRISING NICKEL SULFIDE AND ALL-SOLID STATE BATTERY USING THE SAME

(71) Applicants: Hyundai Motor Company, Seoul (KR); Korea Institute of Science and Technology, Seoul (KR)

(72) Inventors: Yong Jun Jang, Gyeonggi-do (KR); Ju Young Sung, Gyeonggi-do (KR); Yong Sung Lee, Gyeonggi-do (KR); Ho Taek Lee, Seoul (KR); Hyoung Chul Kim, Seoul (KR); Jong Ho Lee, Seoul (KR); Hun Gi Jung, Seoul (KR); Soo Young Cho, Seoul (KR); Yoon Sung Lee, Seoul (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 123 days.

(21) Appl. No.: 15/234,234

(22) Filed: Aug. 11, 2016

(65) Prior Publication Data

US 2017/0170514 A1   Jun. 15, 2017

(30) Foreign Application Priority Data

Dec. 14, 2015   (KR) .................... 10-2015-0178630

(51) Int. Cl.
| | |
|---|---|
| *H01M 10/0562* | (2010.01) |
| *H01M 10/0525* | (2010.01) |
| *C01B 25/14* | (2006.01) |
| *C01B 17/22* | (2006.01) |
| *H01B 1/10* | (2006.01) |
| *H01M 10/052* | (2010.01) |

(52) U.S. Cl.
CPC ......... *H01M 10/0562* (2013.01); *C01B 17/22* (2013.01); *C01B 25/14* (2013.01); (Continued)

(58) Field of Classification Search
None
See application file for complete search history.

(56) References Cited

U.S. PATENT DOCUMENTS

2014/0193693 A1* 7/2014 Hoshina ................. H01B 1/10
429/149

FOREIGN PATENT DOCUMENTS

| JP | 2001006674 | * | 1/2001 |
| JP | 2014-207219 A | | 10/2014 |
| WO | 2013/136524 A1 | | 9/2013 |

OTHER PUBLICATIONS

JP2001006674 English translation. Makoto et al. Japan. Jan. 12, 2001. (Year: 2001).*

(Continued)

*Primary Examiner* — Christopher P Domone
(74) *Attorney, Agent, or Firm* — Mintz Levin Cohn Ferris Glovsky and Popeo, P.C.; Peter F. Corless (57) ABSTRACT

Disclosed is a lithium ion-conductive sulfide-based solid electrolyte which includes nickel sulfide and, accordingly, the solid electrolyte can obtain a novel structure and performance.
More particularly, the sulfide-based solid electrolyte includes lithium sulfide ($Li_2S$), diphosphorus pentasulfide ($P_2S_5$), and nickel sulfide ($Ni_3S_2$) in a specific ratio by mol % and exhibits a novel crystal structure due to nickel (Ni). Accordingly, the sulfide-based solid electrolyte has greater lithium ion conductivity than an conventional sulfide-based solid electrolyte and a stable crystal structure.

12 Claims, 7 Drawing Sheets

(52) U.S. Cl.
CPC ............ *H01B 1/10* (2013.01); *H01M 10/052* (2013.01); *H01M 10/0525* (2013.01); *H01M 2220/20* (2013.01); *H01M 2300/0068* (2013.01); *Y02E 60/122* (2013.01); *Y02T 10/7011* (2013.01)

(56) References Cited

OTHER PUBLICATIONS

Matsumura, Tadaaki et al., "Nickel sulfides as a cathode for all-solid-state ceramic lithium batteries", Jrl of Power Sources, 174 (2007), pp. 632-636.

European Search Report for European Patent Application No. 16185471.6, dated Nov. 14, 2016, 5 pages.

Nishio, Yusuke et al., "All-solid-state lithium secondary batteries using nanocomposites of NiS electrode/Li2S—PsS5 electrolyte prepared via mechanochemical reaction", Jrl of Power Sources, 189 (2009) pp. 629-632.

Ooura, Yuji et al, "Electrochemical properties of the amorphous solid electrolytes in the system Li2S—Al2S3—PsS5", Solid State Ionics, 225 (2012) pp. 350-353.

Minami, Keiichi et al., "Structure-and-properties-of-Li2S—P2S5—P2S3-glass-and-glass-ceramic-electrolytes," Journal of Power Sources, 2009, pp. 651-654.

Hayashi, Akitoshi et al., "Electrode Performance of NiS Nanoparticles Embedded in Sulfide Electrolyte for All-Solid-State Rchargeable Lithium Batteries," Electrochemical Society, Meeting, Abstract #695, 2008.

\* cited by examiner

LITHIUM ION-CONDUCTIVE SULFIDE-BASED SOLID ELECTROLYTE COMPRISING NICKEL SULFIDE AND ALL-SOLID STATE BATTERY USING THE SAME

CROSS-REFERENCE TO RELATED APPLICATION

This application claims under 35 U.S.C. § 119(a) the benefit of priority to Korean Patent Application No. 10-2015-0178630 filed on Dec. 14, 2015, the entire contents of which are incorporated herein by reference.

BACKGROUND (a) Technical Field

The present invention relates to a lithium ion-conductive sulfide-based solid electrolyte which may include nickel sulfide and, accordingly, provide a novel structure and performance of an all-solid state battery.

(b) Background Art

Secondary batteries have been broadly used in small devices, such as mobile phones, camcorders, and notebooks, as well as large devices, such as vehicles and power storage systems. Accordingly, requirements for safety and high performance of batteries have been increased as secondary batteries can be applied to a variety of areas.

A lithium secondary battery, one type of secondary battery, has advantages such as high energy density and capacity per unit area, compared to a nickel-manganese battery or a nickel-cadmium battery.

However, in conventional lithium secondary batteries, a liquid electrolyte such as an organic solvent has been mostly used. Accordingly, problems related to safety, such as a risk of fire due to leakage of an electrolyte may be continuously raised.

Recently, in order to enhance safety, attention to an all-solid state battery using an inorganic solid electrolyte, instead of an organic liquid electrolyte, as an electrolyte has been increased. For example, a solid electrolyte has incombustibility or flame retardancy, and thus, may be safer than the liquid electrolyte.

A solid electrolyte may include an oxide-based solid electrolyte and a sulfide-based solid electrolyte. The sulfide-based solid electrolyte has high lithium ion conductivity, compared to the oxide-based solid electrolyte. In addition, the sulfide-based solid electrolyte has high process flexibility due to superior ductility, thereby being variously utilized.

For example, compounds such as $Li_3PS_4$ and $Li_7P_3S_{11}$ have been mainly used as sulfide-based solid electrolytes. However, these compounds may have less lithium ion conductivity, compared the liquid electrolyte.

In the related arts, U.S. Patent No. 2014-0193693 has disclosed that elements such as aluminum (Al), silicon (Si), iron (Fe), nickel (Ni), and zirconium (Zr) can be added to a sulfide-based solid electrolyte such as thio-LISICON in order to increase lithium ion conductivity. However, in the sulfide-based solid electrolyte, ranges of composition ratios of sulfur (S), lithium (Li), and phosphorus (P) exhibiting high lithium ion conductivity may be limited. In addition, t lithium ion conductivity may increases when the elements are added, however, and have not suggested quantitative correlations, and the like among the elements, sulfur (S), lithium (Li), and phosphorus (P).

The above information disclosed in this Background section is only for enhancement of understanding of the background of the invention and therefore it may contain information that does not form the prior art that is already known in this country to a person of ordinary skill in the art.

SUMMARY

In preferred aspects, the present invention may develop a sulfide-based solid electrolyte exhibiting greater lithium ion conductivity than conventional electrolytes.

In addition, the present invention provides a sulfide-based solid electrolyte having a crystal structure different from the conventional sulfide-based solid electrolytes. Further, the present invention may provide a sulfide-based solid electrolyte having high crystal stability. Also provided is a sulfide-based solid electrolyte exhibiting a high lithium ion conductivity of 1 mS/cm or greater in a broad range of composition ratio.

The scope of the present invention may not be limited to the aforementioned contents. The present invention will be clarified by the following description and accomplished by means disclosed in the accompanying claims and combinations thereof.

In order to accomplish the objects of the present invention, the following embodiments are included.

In one aspect of the present invention, provided is a lithium ion-conductive sulfide-based solid electrolyte which may include lithium sulfide ($Li_2S$), diphosphorus pentasulfide ($P_2S_5$), and nickel sulfide ($Ni_3S_2$) in a ratio of Y:(1−X)(100−Y):X(100−Y) by mol %.

In one preferred embodiment, X may be about 0.2 to 0.5, and Y may be about 60 to 80 mol %.

In one preferred embodiment, X may be about 0.4 and Y may be about 70 mol %.

In one preferred embodiment, X may be about 0.5 and Y may be about 60 mol %.

The solid electrolyte suitably may exhibit a diffraction peak in a diffraction angle (2θ) of about 26±0.5° by X-ray diffraction analysis.

In an exemplary solid electrolyte, a mole ratio (Ni/S) of nickel (Ni) to sulfur (S) suitably may be about 0.1 to 0.35, and a mole ratio (Li/S) of lithium (Li) to sulfur (S) may be about 0.6 to 0.95.

In one preferred embodiment, a mole ratio (Ni/S) of nickel (Ni) to sulfur (S) suitably may be about 0.1 to 0.3, and a mole ratio (Li/S) of lithium (Li) to sulfur (S) may be about 0.6 to 0.9.

In an exemplary solid electrolyte, a mole ratio (P/S) of phosphorus (P) to sulfur (S) suitably may be about 0.13 to 0.25, and a mole ratio (Li/P) of lithium (Li) to phosphorus (P) suitably may be about 2.5 to 5.5.

In one preferred embodiment, a mole ratio (P/S) of phosphorus (P) to sulfur (S) may be suitably 0.15 to 0.20, and a mole ratio (Li/P) of lithium (Li) to phosphorus (P) may be suitably 2.5 to 5.0.

In an exemplary solid electrolyte, a mole ratio (Li/Ni) of lithium (Li) to nickel (Ni) suitably may be about 3 to 6, and a mole ratio (P/Ni) of phosphorus (P) to nickel (Ni) suitably may be about 0.75 to 1.5.

In one preferred embodiment, a mole ratio (Li/Ni) of lithium (Li) to nickel (Ni) may be about 4 to 5.5, and a mole ratio (P/Ni) of phosphorus (P) to nickel (Ni) may be about 0.8 to 1.3.

In an exemplary solid electrolyte, a mole ratio (Li/Ni) of lithium (Li) to nickel (Ni) suitably may be about 4 to 13, and a mole ratio (P/Ni) of phosphorus (P) to nickel (Ni) suitably may be about 1.3 to 2.6.

In one preferred embodiment, a mole ratio (Li/Ni) of lithium (Li) to nickel (Ni) may be about 4.5 to 12, and a mole ratio (P/Ni) of phosphorus (P) to nickel (Ni) may be about 1.5 to 2.5.

In another aspect of the present invention, provided is a method of preparing a solid electrolyte. The method may include: preparing a mixture comprising lithium sulfide ($Li_2S$), diphosphorus pentasulfide ($P_2S_5$), and nickel sulfide ($Ni_3S_2$) in a ratio of Y:(1−X)(100−Y):X(100−Y) by mol %, grinding the mixture, and thermally treating the ground mixture.

In one preferred embodiment, X may be about 0.2 to 0.5, and Y may be about 60 to 80 mol %.

In one preferred embodiment, the mixture may be thermally treated at a temperature of about 200 to 1200° C. for about 1 to 3 hours.

Further provided is an all-solid state battery that may comprise the solid electrolyte as described herein.

Also provided is a vehicle comprising the all-solid state battery that may comprise the solid electrolyte as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail with reference to the following Examples. The scope of the present invention is not limited to the following Examples and covers modifications of the technical spirit substantially equivalent thereto.

In the description of the present invention, certain detailed explanations of related art are omitted when it is deemed that they may unnecessarily obscure the essence of the invention. The lithium ion-conductive sulfide-based solid electrolyte according to the present invention may comprise lithium (Li), nickel (Ni), phosphorus (P), and sulfur (S), as constituent elements. The sulfide-based solid electrolyte according to the present invention can be abbreviated as "LNPS".

Figure 1:
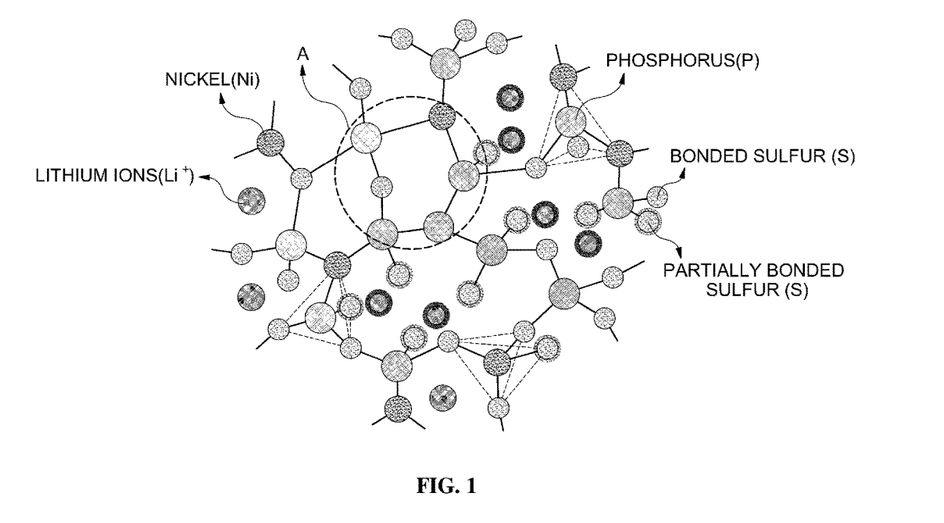
FIG. 1 illustrates an exemplary crystal structure of an exemplary lithium ion-conductive sulfide-based solid electrolyte according to an exemplary embodiment of the present invention.

In particular, LNPS may include lithium sulfide ($Li_2S$), diphosphorus pentasulfide ($P_2S_5$), and nickel sulfide ($Ni_3S_2$) in a ratio of Y:(1−X)(100−Y):X(100−Y) by mol % and may have a novel crystal structure as illustrated in FIG. 1. In Y:(1−X)(100−Y):X(100−Y), X may be about 0.2 to 0.5 and Y may be about 60 to 80 mol %.

Accordingly, LNPS may be represented by Formula 1 below:

$$(Li_2S)_a \cdot (P_2S_5)_b \cdot (Ni_3S_2)_c,$$  [Formula 1]

wherein a is about 6 to 8, b is about 1 to 3.2, c is about 0.4 to 2, which may satisfies: a+b+c=10.

FIG. 1 illustrates a predicted crystal structure of LNPS. In FIG. 1, sulfur (S) may include both bonded sulfur and partially bonded sulfur. The bonded sulfur is a sulfur element of which the valence shell is fully filled by being bonded to other elements. On the other hand, the partially bonded sulfur is a sulfur element of which the valence shell is partially filled and, accordingly, which may provide electric charge.

As shown in FIG. 1, LNPS may have a gap A due to nickel (Ni) bonded to sulfur (S) and/or phosphorus (P). As such, lithium ions (Li$^+$) migrate in a manner of hopping between ii) the partially bonded sulfurs via i) the gap A.

LNPS may have a crystal structure illustrated in FIG. 1, and thus, the following effects may be achieved.

1) First, since LNPS has a crystal structure including nickel (Ni), high lithium ion conductivity may be obtained.

Since lithium ions (Li$^+$) migrate through the gap A, migration thereof may occur often as van der Waals radius of an element forming the gap A decreases. The van der Waals radiuses of elements mainly included in conventional sulfide-based solid electrolytes are as follows:

Phosphorus (180 pm), sulfur (180 pm), tin (217 pm), silicon (210 pm), arsenic (185 pm)

On the other hand, since the van der Waals radius of nickel (Ni) is 163 pm which is much smaller than the van der Waals radiuses of the aforementioned other elements, the lithium ions (Li$^+$) may easily pass through the gap A when the crystal structure includes nickel (Ni).

In addition, since the lithium ions (Li$^+$) may hop between the partially bonded sulfurs by electrostatic attraction, migration thereof may be promoted as electronegativity difference between the elements of the crystal structure and lithium ions (Li$^+$) decreases. Electronegativity of each of the elements mainly included in conventional sulfide-based solid electrolytes is as follows:

Lithium (0.98), phosphorus (2.19), sulfur (2.58), tin (1.96), silicon (1.9), germanium (2.01)

On the other hand, the electronegativity of nickel (Ni) is about 1.91. That is, an electronegativity difference between nickel (Ni) and lithium may be less than or equal to those between the aforementioned other elements and lithium. Accordingly, lithium ions (Li$^+$) may easily hop between partially bonded sulfurs.

For such a reason, LNPS may exhibit greater lithium ion conductivity than the conventional sulfide-based solid electrolytes.

2) LNPS may be stable due to a crystal structure including nickel (Ni).

This may be described by the hard and soft acids and bases (HSAB) principle.

Since sulfur (S) is a weak base and phosphorus (P) is a strong acid, they do not stably bind to each other. Accordingly, when nickel (Ni), as a medium acid, being less acidic than phosphorus (P), may be included in the crystal structure, reactivity may be enhanced, compared to the case in which sulfur (S), as a weak base, is used and stability may also be increased upon bonding.

For this reason, stability of the crystal structure of LNPS may be improved than that of the conventional sulfide-based solid electrolytes.

EXAMPLE

Hereinafter, the present invention will be described in more detail with reference to the following Examples. The scope of the present invention is not limited to the following Examples and covers modifications of the technical spirit substantially equivalent thereto.

Experimental Example 1

Measurement of Lithium Ion Conductivity Depending Upon Element Composition Ratio of LNPS LNPS preferably included lithium sulfide (Li$_2$S), diphosphorus pentasulfide (P$_2$S$_5$), and nickel sulfide (Ni$_3$S$_2$) in a ratio of Y:(1−X)(100−Y):X(100−Y) by mol %, wherein X was 0.2 to 0.5, and Y was 60 to 80 mol %.

LNPS was prepared by varying X and Y as summarized in the following Table 1, and then, lithium ion conductivity thereof was measured.

TABLE 1

| Examples | X | Y [mol %] |
|---|---|---|
| 1 | 0.2 | 60 |
| 2 | 0.2 | 70 |
| 3 | 0.2 | 80 |
| 4 | 0.3 | 60 |
| 5 | 0.3 | 70 |
| 6 | 0.3 | 80 |
| 7 | 0.4 | 60 |
| 8 | 0.4 | 70 |
| 9 | 0.4 | 80 |
| 10 | 0.5 | 60 |
| 11 | 0.5 | 70 |
| 12 | 0.5 | 80 |

An exemplary LNPS was prepared as follows.

(1) Lithium sulfide, diphosphorus pentasulfide and nickel sulfide were weighed according to X and Y (mol %) of Table 1, and sufficiently mixed to prepare a mixture.

(2) The mixture was ground using zirconia (ZrO$_2$) beads. Here, a container for grinding was a planetary ball mill container. Grinding was continuously performed for eight hours at 650 rpm.

(3) A vitrified or partially vitrified mixture through grinding was thermally treated at a temperature of 260° C. for two hours. Finally, a crystallized powder (LNPS) was obtained.

Lithium ion conductivity of LNPS according to Examples 1 to 12 was measured according to the following method.

LNPS was prepared into a molded product (diameter: 6 mm, thickness: 0.6 mm) for measuring by compression molding. An alternating current potential of 100 mV was applied to the molded product. Subsequently, a sweep frequency of 1×10$^7$ to 1 Hz was performed and an impedance value was measured to obtain lithium ion conductivity.

Figure 2:
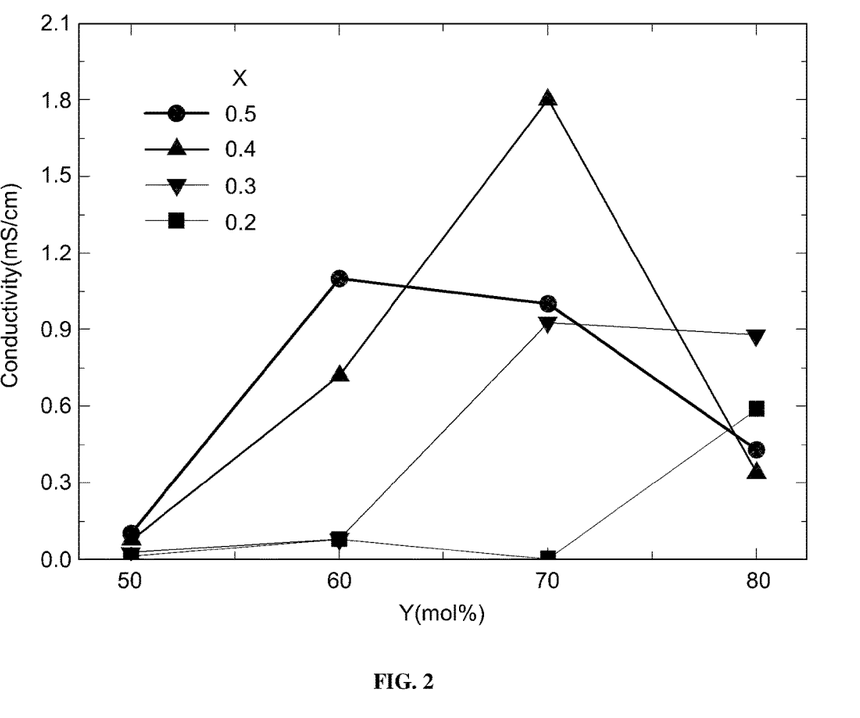
FIG. 2 illustrates lithium ion conductivity of exemplary solid electrolytes according to Examples 1 to 12 of the present invention.

Results are illustrated in FIG. 2.

As shown in FIG. 2, it can be confirmed that lithium ion conductivity of LNPS according to Example 8 in which X was 0.4 and Y was 70 mol % is highest.

As described above, nickel sulfide (Ni$_3$S$_2$) of LNPS according to the present invention functioned as an intermediate of a network in a basic crystal structure composed of lithium sulfide (Li$_2$S) and diphosphorus pentasulfide (P$_2$S$_5$).

Accordingly, when the amount of nickel sulfide is greater or less than the predetermined amount, dispersibility may be decreased upon mixing and a crystal structure of a finally crystallized powder might not be normally formed. Accordingly, it may be important to properly adjust the amount of nickel sulfide included in LNPS.

Figure 3:
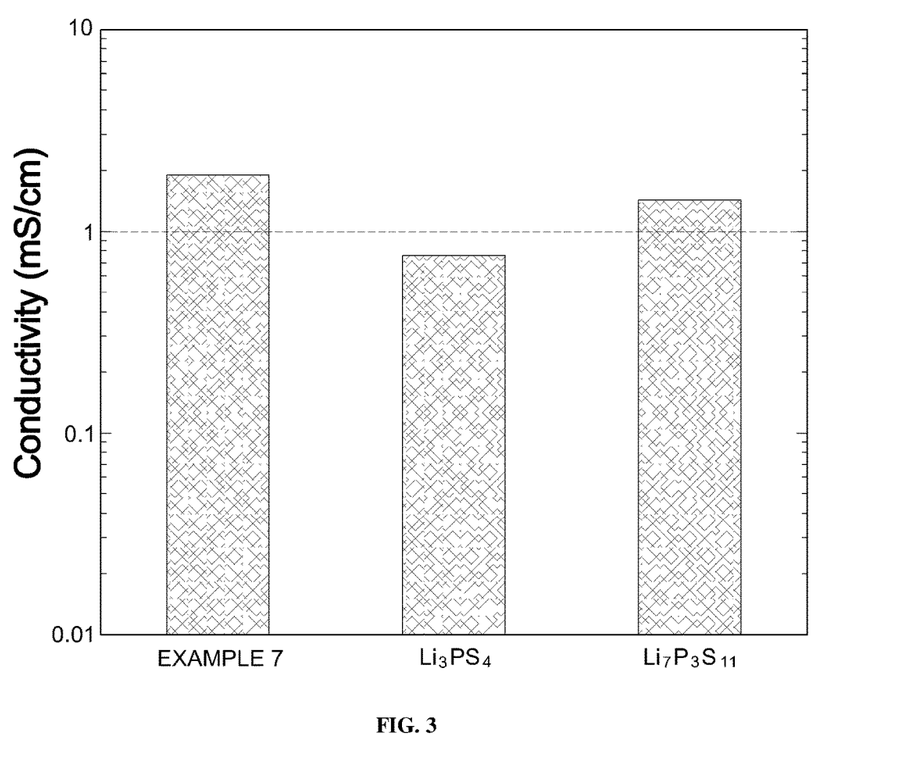
FIG. 3 illustrates a comparison result of lithium ion conductivity of an exemplary sulfide-based solid electrolyte according to Example 8 of the present invention and lithium ion conductivity of $Li_3PS_4$ and $Li_7P_3S_{11}$.

Lithium ion conductivity of LNPS according to Example 8 and lithium ion conductivity of currently, generally used sulfide-based solid electrolytes, i.e., $Li_3PS_4$ and $Li_7P_3S_{11}$ were compared and illustrated in FIG. 3.

Lithium ion conductivity of $Li_3PS_4$ and $Li_7P_3S_{11}$ was measured in the same manner as in Example 8.

As shown in FIG. 3, the crystal structure of LNPS (Example 8, X=0.4, Y=70 mol %) according to the present invention included nickel sulfide (exactly nickel), thereby exhibiting increased lithium ion conductivity, compared to $Li_3PS_4$ and $Li_7P_3S_{11}$.

Experimental Example 2

Analysis of X-Ray Diffraction of LNPS

To see crystal structures of LNPSs according to Examples 7 to 9 of Experimental Example 1, X-ray diffraction analysis was performed. Results are illustrated in FIG. 4.

Figure 4:
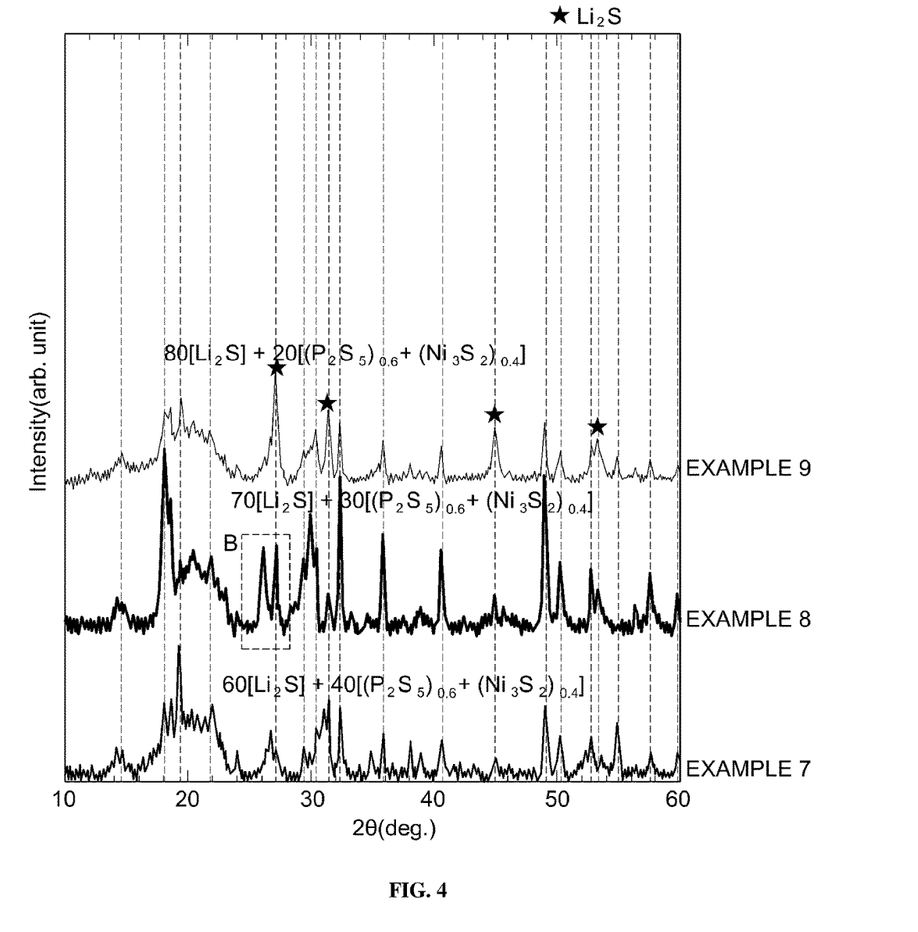
FIG. 4 illustrates X-ray diffraction analysis results of exemplary sulfide-based solid electrolytes according to Examples 7 to 9 of the present invention.

As shown in FIG. 4, it can be confirmed that most peaks are similar. However, it can be confirmed that, in the case of Example 8 which exhibited the greatest lithium ion conductivity, specific peaks B were exhibited when a diffraction angle (2θ) was 26±0.5°.

This is evidence showing that there was a slight difference between a crystal structure of Example 8 and crystal structures of Examples 7 and 9. It can be predicted that the lithium ion conductivity of Example 8 was increased by such a difference.

That is, LNPS according to Example 8 formed a specific structure due to nickel sulfide (nickel) included in a specific ratio, thereby exhibiting high lithium ion conductivity.

Experimental Example 3

Correlation Between Mole Ratio of Each Element Included in LNPS and Lithium Ion Conductivity As described above, LNPS according to the present invention included lithium (Li), nickel (Ni), phosphorus (P) and sulfur (S), as constituent elements. Accordingly, correlation between a mole ratio among the constituent elements and lithium ion conductivity was obtained.

In the same manner as in Experimental Example 1, LNPS was prepared such that a ratio of lithium sulfide ($Li_2S$): diphosphorus pentasulfide ($P_2S_5$):nickel sulfide ($Ni_3S_2$) was Y:(1−X)(100−Y):X(100−Y) by mol %. Here, X and Y may not be limited to specific numerals and may be various.

Lithium ion conductivity of the prepared LNPS was measured. Lithium ion conductivity values of LNPS according to mole ratios of lithium (Li), nickel (Ni), phosphorus (P) and sulfur (S) were represented as contour graphs. Results are illustrated in FIGS. 5 to 7.

Figure 5:
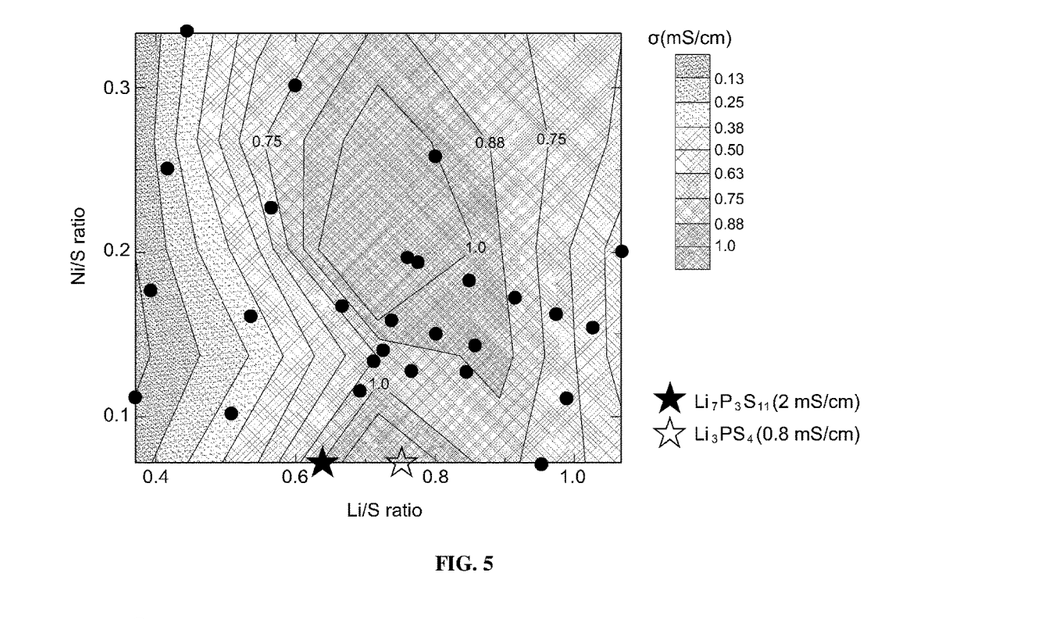
FIG. 5 illustrates a contour graph of correlations between mole ratios of constituent elements (Li, Ni and S) of an exemplary sulfide-based solid electrolyte according to Experimental Example 3 of the present invention and lithium ion conductivity.
Figure 6:
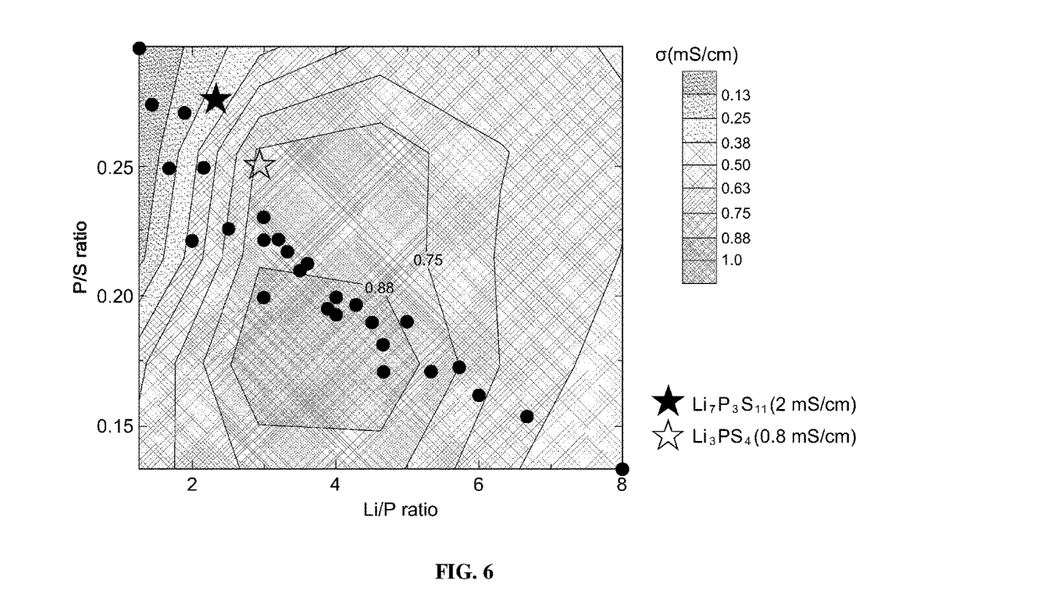
FIG. 6 illustrates a contour graph of correlations between mole ratios of constituent elements (Li, P and S) of an exemplary sulfide-based solid electrolyte according to Experimental Example 3 of the present invention and lithium ion conductivity.
Figure 7:
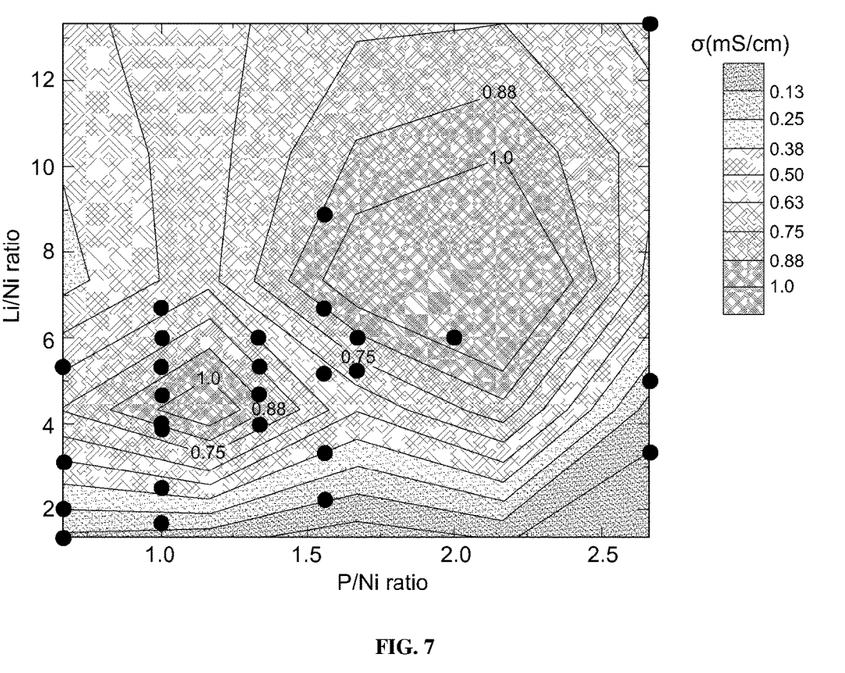
FIG. 7 illustrates a contour graph of correlations between mole ratios of constituent elements (Li, Ni and P) of an exemplary sulfide-based solid electrolyte according to Experimental Example 3 of the present invention and lithium ion conductivity.

As shown in FIGS. 5 to 7, in the following cases, LNPS showed high lithium ion conductivity.

1) According to FIG. 5, in LNPS, when a mole ratio (Ni/S) of nickel (Ni) to sulfur (S) was 0.01 to 0.35, and a mole ratio (Li/S) of lithium (Li) to sulfur (S) was 0.6 to 0.95, lithium ion conductivity was 0.75 mS/cm or greater.

Preferably, in LNPS, when a mole ratio (Ni/S) of nickel (Ni) to sulfur (S) was 0.1 to 0.3, and a mole ratio (Li/S) of lithium (Li) to sulfur (S) was 0.6 to 0.9, lithium ion conductivity was 0.88 mS/cm or greater.

More preferably, when a mole ratio (Ni/S) of nickel (Ni) to sulfur (S) was 0.15 to 0.3, and a mole ratio (Li/S) of lithium (Li) to sulfur (S) was 0.62 to 0.85, high lithium ion conductivity of 1.0 mS/cm or greater was obtained.

2) According to FIG. 6, in LNPS, when a mole ratio (P/S) of phosphorus (P) to sulfur (S) was 0.13 to 0.25, and a mole ratio (Li/P) of lithium (Li) to phosphorus (P) was 2.5 to 5.5, high lithium ion conductivity of 0.75 mS/cm or greater was exhibited.

Preferably, in LNPS, when a mole ratio (P/S) of phosphorus (P) to sulfur (S) was 0.15 to 0.20, and a mole ratio (Li/P) of lithium (Li) to phosphorus (P) was 2.5 to 5.0, high lithium ion conductivity of 0.88 mS/cm or greater was exhibited.

3) According to FIG. 7, in LNPS, when a mole ratio (Li/Ni) of lithium (Li) to nickel (Ni) was 3 to 6, and a mole ratio (P/Ni) of phosphorus (P) to nickel (Ni) was 0.75 to 1.5, lithium ion conductivity was 0.75 mS/cm or greater.

Preferably, in LNPS, a mole ratio (Li/Ni) of lithium (Li) to nickel (Ni) was 4 to 5.5, and a mole ratio (P/Ni) of phosphorus (P) to nickel (Ni) was 0.8 to 1.3, lithium ion conductivity is 0.88 mS/cm was greater.

More preferably, when a mole ratio (Li/Ni) of lithium (Li) to nickel (Ni) was 4 to 5, and a mole ratio (P/Ni) of phosphorus (P) to nickel (Ni) was 1 to 1.25, high lithium ion conductivity of 1.0 mS/cm or greater was exhibited.

4) According to FIG. 7, in LNPS, when a mole ratio (Li/Ni) of lithium (Li) to nickel (Ni) was 4 to 13, and a mole ratio (P/Ni) of phosphorus (P) to nickel (Ni) was 1.3 to 2.6, lithium ion conductivity was 0.75 mS/cm or greater.

Preferably, in LNPS, when a mole ratio (Li/Ni) of lithium (Li) to nickel (Ni) was 4.5 to 12, and a mole ratio (P/Ni) of phosphorus (P) to nickel (Ni) was 1.5 to 2.5, lithium ion conductivity was 0.88 mS/cm or greater.

More preferably, when a mole ratio (Li/Ni) of lithium (Li) to nickel (Ni) was 5.5 to 10, and a mole ratio (P/Ni) of phosphorus (P) to nickel (Ni) was 1.5 to 2.3, high lithium ion conductivity of 1.0 mS/cm or greater was exhibited.

Accordingly, it can be confirmed that LNPS according to the present invention may have high lithium ion conductivity in a broad range of composition ratio, unlike conventional $Li_3PS_4$, $Li_7P_3S_{11}$, or the like.

In addition, as shown in FIGS. 5 to 7, it can be reconfirmed that, when LNPS according to the present invention included lithium sulfide ($Li_2S$), diphosphorus pentasulfide ($P_2S_5$) and nickel sulfide ($Ni_3S_2$) in a mol % ratio (X=0.4, Y=70 mol %) according to Example 8 of Experimental Example 1, the greatest lithium ion conductivity was exhibited.

In particular, LNPS of Example 8 may be represented by the following equation:

$$70 \cdot Li_2S + 18 \cdot P_2S_5 + 12 \cdot Ni_3S_2 = Li_{140}Ni_{36}P_{36}S_{184}$$

Accordingly, a mole ratio of each element of LNPS according to Example 8 may be specified by coordinates of FIGS. 5 to 7. Results are summarized in Table 2 below.

TABLE 2

| Classification | X axis | | Y axis | |
|---|---|---|---|---|
| FIG. 5 | Li/S | 0.76 | Ni/S | 0.2 |
| FIG. 6 | Li/P | 3.9 | P/S | 0.2 |
| FIG. 7 | P/Ni | 1 | Li/Ni | 3.9 |

As shown in Table 2, it can be confirmed that each coordinate is a summit (or near summit) of contour graphs.

Experimental Example 4

Change in Lithium Ion Conductivity by Thermal Treatment Upon Preparation of LNPS An exemplary LNPS according to the present invention was prepared according to the following steps:

(1) A step of preparing a mixture such that a ratio of lithium sulfide ($Li_2S$):diphosphorus pentasulfide ($P_2S_5$): nickel sulfide ($Ni_3S_2$) was Y:(1−X)(100−Y):X(100−Y) by mol %, wherein X was 0.2 to 0.5, and Y was 60 to 80 mol %;

(2) a step of grinding the mixture; and (3) a step of thermally treating the ground mixture.

In step (2), the mixture was ground by planetary ball milling, vibratory milling, SPEX milling, APEX milling, and the like.

In addition, the ground mixture was thermally treated at a temperature 200 to 1200° C. for one to three hours in step (3).

In particular, the method of preparing LNPS according to the present included vitrifying or partially vitrifying the mixture in step (2) and then crystallizing the mixture through thermal treatment in step (3).

Figure 8:
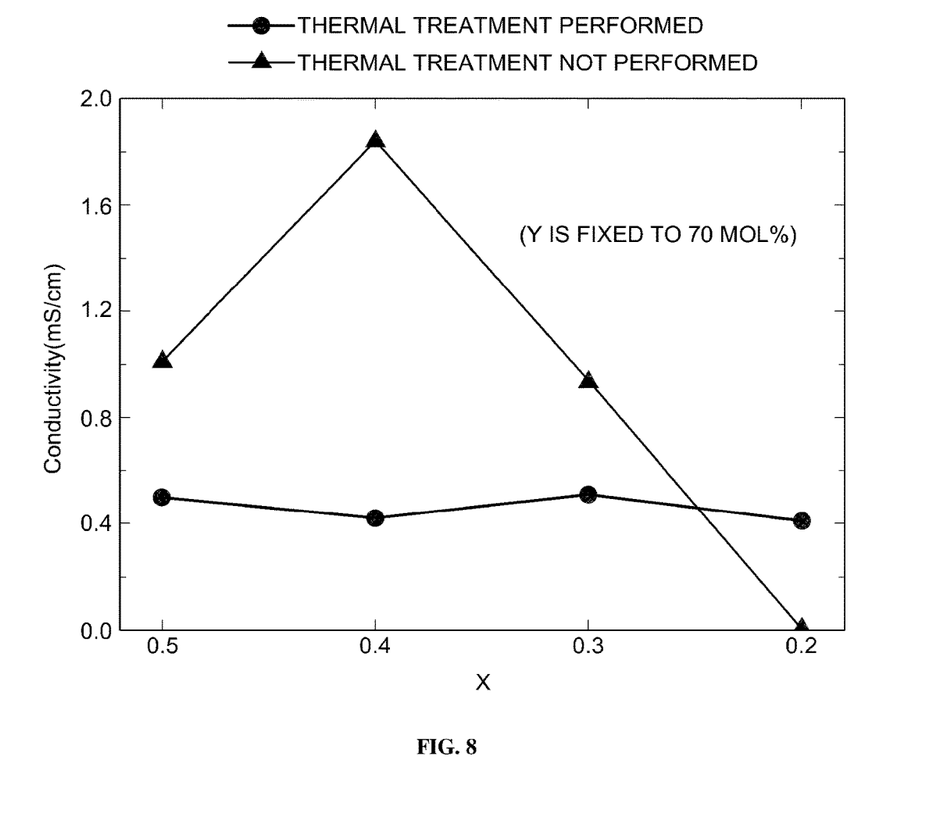
FIG. 8 illustrates measurement results for lithium ion conductivity changes due to thermal treatment upon preparation of an exemplary sulfide-based solid electrolyte according to an exemplary embodiment of the present invention.

Accordingly, lithium ion conductivity of LNPS which had X and Y values equal to those of Examples 2, 5, 8 and 11 of Experimental Example 1, but was not subjected to the thermal treatment of step (3), was measured. Results are illustrated in FIG. 8.

Accordingly, it can be confirmed that lithium ion conductivity was increased by the thermal treatment.

In addition, it can be confirmed that the samples which were not thermally treated exhibited constant lithium ion conductivity regardless of a composition ratio of each element, whereas lithium ion conductivity of thermally treated samples was greatly affected by the composition ratio of each element. Accordingly, it can be confirmed that a formed crystal structure was dependent upon a mole ratio of each element of LNPS and a ratio among the raw materials by mol % when LNPS was crystallized through thermal treatment.

According to various exemplary embodiments, the present invention may provide has the following effects.

The sulfide-based solid electrolyte according to an exemplary embodiment of the present invention may include a nickel sulfide ($Ni_xS_y$) crystal structure therein, thereby exhibiting greater lithium ion conductivity than conventional electrolytes. In addition, in the sulfide-based solid electrolyte according to an exemplary embodiment of the present invention, each element may be arranged in a novel crystal structure and, accordingly, a stable crystal structure can be obtained.

In addition, the sulfide-based solid electrolyte according to the present invention may include sulfur (S), lithium (Li), nickel (Ni) and phosphorus (P) exhibiting high lithium ion conductivity of 1 mS/cm or greater, in a broad range of composition ratio. Accordingly, when a process condition is changed or a process should be controlled in accordance with given environment, flexible processes are possible and, accordingly, high-quality products may be stably produced.

Effects of the present invention are not limited to the aforementioned effects. It should be understood that effects of the present invention include all effects construed by the following description.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A solid electrolyte, comprising lithium sulfide ($Li_2S$), diphosphorus pentasulfide ($P_2S_5$), and nickel sulfide ($Ni_3S_2$), wherein a ratio of lithium sulfide ($Li_2S$):diphosphorus pentasulfide ($P_2S_5$):nickel sulfide ($Ni_3S_2$) is Y:(1−X)(100−Y):X(100−Y) by mol %, and wherein X is about 0.2 to 0.5, and Y is about 60 to 80 mol %.

2. The solid electrolyte according to claim 1, wherein X is about 0.4 and Y is about 70 mol %.

3. The solid electrolyte according to claim 1, wherein X is about 0.5 and Y is about 60 mol %.

4. The solid electrolyte according to claim 2, wherein a diffraction peak is exhibited at a diffraction angle (2θ) of about 26±0.5 of X-ray diffraction spectrum.

5. The sulfide-based solid electrolyte according to claim 1, wherein a mole ratio (Ni/S) of nickel (Ni) to sulfur (S) is about 0.1 to 0.3, and a mole ratio (Li/S) of lithium (Li) to sulfur (S) is about 0.6 to 0.9.

6. The solid electrolyte according to claim 1, wherein a mole ratio (P/S) of phosphorus (P) to sulfur (S) is about 0.15 to 0.20, and a mole ratio (Li/P) of lithium (Li) to phosphorus (P) is about 2.5 to 5.0.

7. The solid electrolyte according to claim 1, wherein a mole ratio (Li/Ni) of lithium (Li) to nickel (Ni) is about 4 to 5.5, and a mole ratio (P/Ni) of phosphorus (P) and nickel (Ni) is about 0.8 to 1.3.

8. The solid electrolyte according to claim 1, wherein a mole ratio (Li/Ni) of lithium (Li) to nickel (Ni) is about 4.5 to 12, and a mole ratio (P/Ni) of phosphorus (P) to nickel (Ni) is about 1.5 to 2.5.

9. A method of preparing a solid electrolyte, the method comprising:

preparing a mixture comprising lithium sulfide ($Li_2S$), diphosphorus pentasulfide ($P_2S_5$), and nickel sulfide ($Ni_3S_2$), wherein a ratio of the lithium sulfide ($Li_2S$):the diphosphorus pentasulfide ($P_2S_5$):the nickel sulfide ($Ni_3S_2$) is Y:(1−X)(100−Y):X(100−Y) by mol %, wherein X is about 0.2 to 0.5, and Y is about 60 to 80 mol %;

grinding the mixture; and thermally treating the ground mixture.

10. The method according to claim 9, wherein, the ground mixture is thermally treated at a temperature of about 200 to 1200° C. for about 1 to 3 hours.

11. An all-solid state battery comprising the solid electrolyte according to claim 1.

12. A vehicle comprising the all-solid state battery of claim 11.

* * * * *